(12) United States Patent
Ribarov et al.

(10) Patent No.: US 8,464,511 B1
(45) Date of Patent: Jun. 18, 2013

(54) MAGNETICALLY COUPLED CONTRA-ROTATING PROPULSION STAGES

(75) Inventors: Lubomir A. Ribarov, West Hartford, CT (US); Jacek F. Gieras, Glastonbury, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 41 days.

(21) Appl. No.: 13/344,697

(22) Filed: Jan. 6, 2012

(51) Int. Cl.
*F02K 3/02* (2006.01)

(52) U.S. Cl.
USPC .......................................... 60/226.1; 60/268

(58) Field of Classification Search
USPC .............. 60/39.162, 39.163, 226.1, 268, 801, 60/802; 310/103–105
See application file for complete search history.

(56) References Cited

U.S. PATENT DOCUMENTS

| | | | |
|---|---|---|---|
| 3,187,191 | A | 6/1965 | Baggs |
| 4,556,366 | A | 12/1985 | Sargisson et al. |
| 6,263,664 | B1 | 7/2001 | Tanigawa et al. |
| 6,873,071 | B2 | 3/2005 | Dooley |
| 6,895,741 | B2 | 5/2005 | Rago et al. |
| 7,119,461 | B2 | 10/2006 | Dooley |
| 7,410,123 | B2 | 8/2008 | Nunnally |
| 7,709,980 | B2 | 5/2010 | Dooley |
| 7,791,235 | B2 | 9/2010 | Kern et al. |
| 7,926,287 | B2 | 4/2011 | Ullyott et al. |
| 2006/0016929 | A1 | 1/2006 | Mohr |
| 2008/0089786 | A1 | 4/2008 | Sinreich |
| 2009/0289516 | A1 * | 11/2009 | Hopewell et al. ............. 310/115 |
| 2010/0236849 | A1 | 9/2010 | Wishart |
| 2010/0326050 | A1 | 12/2010 | Schilling et al. |
| 2010/0327588 | A1 * | 12/2010 | Macchia ........................ 290/52 |
| 2011/0024567 | A1 | 2/2011 | Blackwelder et al. |
| 2011/0040946 | A1 | 2/2011 | Courtney |

* cited by examiner

*Primary Examiner* — Phutthiwat Wongwian
(74) *Attorney, Agent, or Firm* — Kinney & Lange, P.A.

(57) ABSTRACT

A turbomachine comprises a turbine shaft, first and second rotors, first and second propulsion stages, and a magnetic stator. The first rotor is rotationally coupled to the turbine shaft, and coaxially arranged along an axis. The first propulsion stage is rotationally coupled to the first rotor, opposite the turbine shaft. The second rotor is coaxially arranged about the first rotor, and the second propulsion stage is rotationally coupled to second rotor, opposite the turbine shaft and adjacent the first propulsion stage. The magnetic stator is coaxially arranged between the first rotor and the second rotor, forming a magnetic coupling between the and second rotors to drive the second propulsion stage in contra-rotation with respect to the first propulsion stage.

20 Claims, 4 Drawing Sheets

MAGNETICALLY COUPLED CONTRA-ROTATING PROPULSION STAGES

BACKGROUND

This invention relates generally to turbomachinery, and specifically to gas turbine engines for aviation applications. In particular, the invention concerns a propulsion turbine with contra-rotating rotor stages.

Gas turbine engines are rotary-type combustion turbine engines built around a power core made up of a compressor, combustor and turbine, arranged in flow series with an upstream inlet and downstream exhaust. The compressor compresses air from the inlet, which is mixed with fuel in the combustor and ignited to generate hot combustion gas. The turbine extracts energy from the expanding combustion gas, and drives the compressor via a common shaft. Energy is delivered in the form of rotational energy in the shaft, reactive thrust from the exhaust, or both.

Gas turbine engines provide efficient, reliable power for a wide range of applications, including aviation and industrial power generation. Smaller-scale engines such as auxiliary power units typically utilize a one-spool design, with co-rotating compressor and turbine sections. Larger-scale jet engines and industrial gas turbines (IGTs) are generally arranged into a number of coaxially nested spools, which operate at different pressures and temperatures, and rotate at different speeds.

The individual compressor and turbine sections in each spool are subdivided into a number of stages, which are formed of alternating rows of rotor blade and stator vane airfoils. The airfoils are shaped to turn, accelerate and compress the working fluid flow, and to generate lift for conversion to rotational energy in the turbine.

Aviation applications include turbojet, turbofan, turboprop and turboshaft engines. In turbojet engines, thrust is generated primarily from the exhaust. Modern fixed-wing aircraft generally employ turbofan and turboprop designs, in which the low pressure spool is coupled to a propulsion fan or propeller. Turboshaft engines are typically used on rotary-wing aircraft, including helicopters.

Turbofan engines are commonly divided into high and low bypass configurations. High bypass turbofans generate thrust primarily from the fan, which drives airflow through a bypass duct oriented around the engine core. This design is common on commercial aircraft and military transports, where noise and fuel efficiency are primary concerns. Low bypass turbofans generate proportionally more thrust from the exhaust flow, providing greater specific thrust for use on high-performance aircraft including supersonic jet fighters. Unducted (open rotor) turbofans and ducted propeller engines are also known, in a variety of counter-rotating and aft-mounted configurations.

In coaxial, contra-rotating propulsion engines, rotor coupling is a critical design consideration. Where weight, efficiency and rotor speed are concerned, moreover, they often pose competing demands on the rotor coupling mechanism.

SUMMARY

This invention concerns magnetically coupled coaxial, contra-rotating propulsion stages, for example in a contra-rotating turbofan or turboprop engine. A first rotor is rotationally driven about an axis, and coupled to a first propulsion stage. A second rotor is coaxially mounted about the first rotor, and coupled to a second propulsion stage. A magnetic stator is coaxially arranged between the first and second rotors, forming a magnetic coupling to drive the second propulsion stage in contra-rotation with respect to the first propulsion stage.

DETAILED DESCRIPTION

Figure 1:
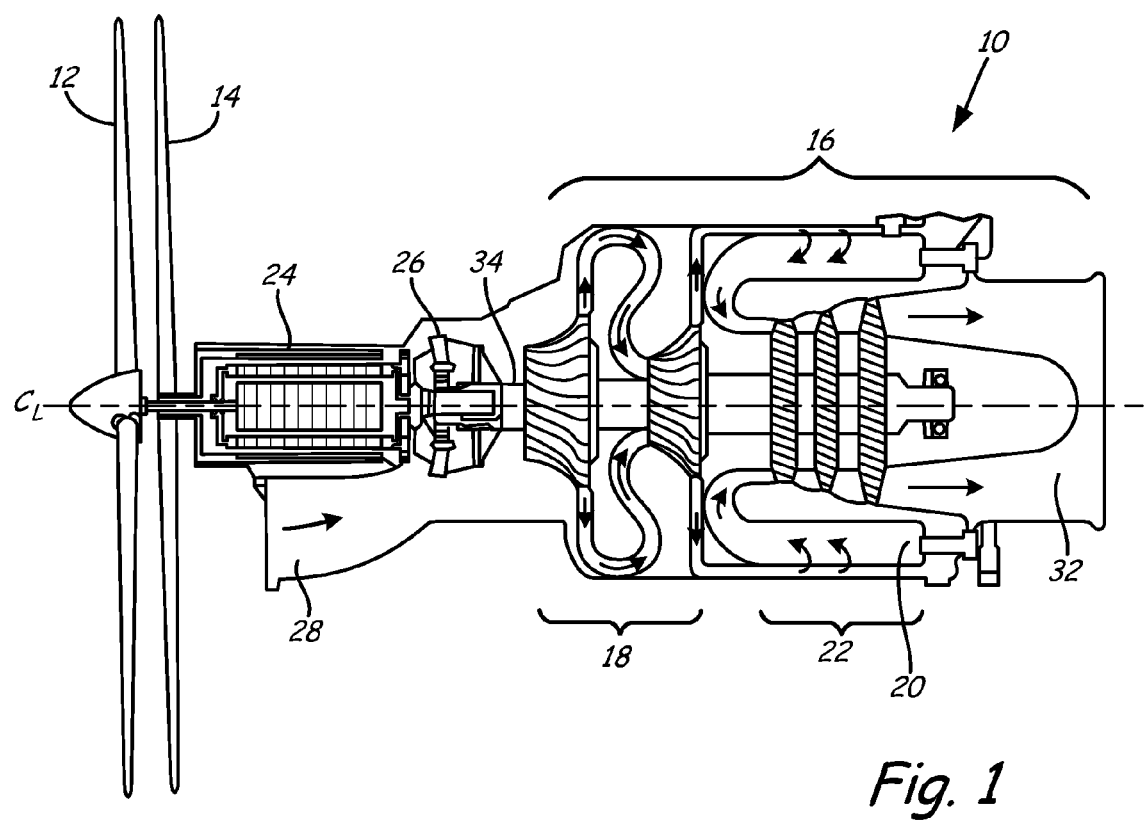
FIG. 1 is a cross-sectional view of a gas turbine engine with magnetically coupled coaxial, contra-rotating propulsion stages.

FIG. 1 is a cross-sectional view of gas turbine engine 10 with magnetically coupled coaxial, contra-rotating propulsion rotor stages 12 and 14. Gas turbine engine 10 comprises engine core 16 with compressor section 18, combustor 20 and turbine section 22. Magnetic coupling drive system 24 is mechanically coupled to engine core 16 via reduction gearbox 26, in order to drive propulsion stages 12 and 14 in contra-rotation about engine axis (or centerline) $C_L$.

In the particular example of FIG. 1, gas turbine engine 10 is configured as a contra-rotating turboprop engine, with three-spool engine core 16 and contra-rotating propeller rotors 12 and 14. Intake 28 is located below engine centerline $C_L$, and combustor 20 has a reverse-flow configuration from compressor section 18 to turbine section 22, exhausting to downstream (jet) nozzle 32.

Alternatively, gas turbine engine 10 is configured as an axial-flow turbofan, with contra-rotating fan stages 12 and 14. In other applications, engine core 16 has one-spool, two-spool and multi-spool configurations for use in turboprop, turbofan and turbojet engines, with compressor 18, combustor 20 and turbine 22 provided in a variety of axial, radial, and axial/radial flow configurations. Similarly, propulsion rotors 12 and 14 have both ducted and unducted (free) rotor blade configurations, with different forward and aft mounting arrangements.

In operation of gas turbine engine 10, air from inlet 28 is compressed in compressor section 18 and mixed with fuel in combustor 20. The fuel/air mixture is ignited to produce hot combustion gas, which drives turbine section 22, and is exhausted downstream through nozzle 32.

Turbine section 22 is rotationally coupled to compressor section 18 via a series of coaxial shafts. Compressor section 18 is rotationally coupled to magnetic drive 24 via reduction gearbox 26, for example a planetary gear or spur gear transmission. Magnetic drive 24 couples upstream propulsion rotor 12 to downstream propulsion rotor 14, driving stages 12 and 14 in contra-rotation about centerline $C_L$ to generate thrust for gas turbine engine 10.

In typical turboprop engines, a single-stage propeller is coupled to the power core (or turbine) through an offset reduction gear. The offset gearing converts high RPM, low torque engine shaft output to lower RPM, higher torque propeller shaft output, keeping the tips of the propeller blades below sonic speeds. In constant speed systems, thrust control is provided by a variable pitch mechanism.

Gas turbine engine 10, in contrast, utilizes coaxial, contra-rotating propulsion stages 12 and 14, arranged coaxially and spaced one behind the other along engine centerline $C_L$. This is distinguished from, and should not be confused with, counter-rotating propeller designs, in which the propellers on two or more different engines turn in opposite directions to reduce torque effects.

As shown in FIG. 1, power is transferred from engine core 16 to magnetic drive 24 via coaxial gearbox 26 on turbine engine shaft 34. In other designs, a direct coupling is used, and reduction gearbox 26 is not present. Alternatively, gearbox 26 has an offset configuration, with magnetic drive 24 and propulsion stages 12 and 14 rotating about a common axis parallel to engine centerline $C_L$.

Turboprop engines are known for their low specific fuel consumption (SFC), high reliability, simple design, and high power-to-weight ratios, and are commonly used by regional and commuter airlines. Turboprop aircraft allow for quick roll-out and climb from short take-off locations, combined with effective reverse thrust braking. These capabilities make turboprop aircraft ideal for smaller regional and municipal airports, where larger and heavier aircraft are unable to operate efficiently.

Traditional turboprop-powered aircraft do have limitations, however, including lower service altitude (<20,000 ft, or about 6,000 m), lower cruise speed (<450 mph, or about 725 km/hr), and limited cabin pressurization. In addition, turboprop aircraft often rely on ground support for cabin power, pre-heat and pre-cool capabilities.

From a thrust perspective, the air mass flowing through a propeller disk (or disc) also generates tangential (or circumferential) airflow. The effect can be substantial at low airspeed, and the energy of this rotational airflow is lost in single-stage propeller designs. P-factor effects are also experienced at high wing angles of attack, when the propeller rotor is not perpendicular to the airflow. This results in asymmetric propeller loading on the upper and lower blade rotation, producing an off-center or asymmetric center of thrust.

To address these problems, gas turbine engine 10 utilizes a second contra-rotating propulsion stage 14, positioned coaxially with and directly behind (downstream of) first propulsion stage 12. Second (downstream) propulsion stage 14 takes advantage of the rotational airflow generated by first (upstream) propulsion stage 12, increasing performance and efficiency by utilizing the rotational flow energy to generate additional thrust.

Contra-rotating propulsion stages 12 and 14 also reduce P-factor effects, eliminating directional biasing due to asymmetric propeller torque for greater maximum power and efficiency during takeoff and landing operations. Contra-rotating propulsion stages 12 and 14 thus drive air more uniformly, with less thrust asymmetry and rotation in the downstream airflow, providing higher performance and lower induced energy losses.

As a result, contra-rotating propulsion stages 12 and 14 typically 5-15% more efficient than a traditional (single-stage) turboprop engine. These efficiency gains can be offset, however, by increased weight and mechanical complexity. Traditional contra-rotating propellers can also be noisy, particularly at higher engine frequencies due to the increased blade passing frequency (BPF).

Noise and vibration effects can be reduced by using a different number of blades on contra-rotating propulsion stages 12 and 14, for example three, four or five blades on upstream (forward) stage 12, and four, five or six blades on downstream (aft) stage 14. In addition, magnetic drive 24 reduces weight and heat losses, as compared to a planetary gear drive or other contra-rotating mechanical drive. Magnetic drive 24 can also be configured to drive propulsion stages 12 and 14 at different speeds, or to decouple one or both of propulsion stages 12 and 14, in order to reduce noise, improve efficiency, and provide greater power and climate control capability for ground operations.

Figure 2:
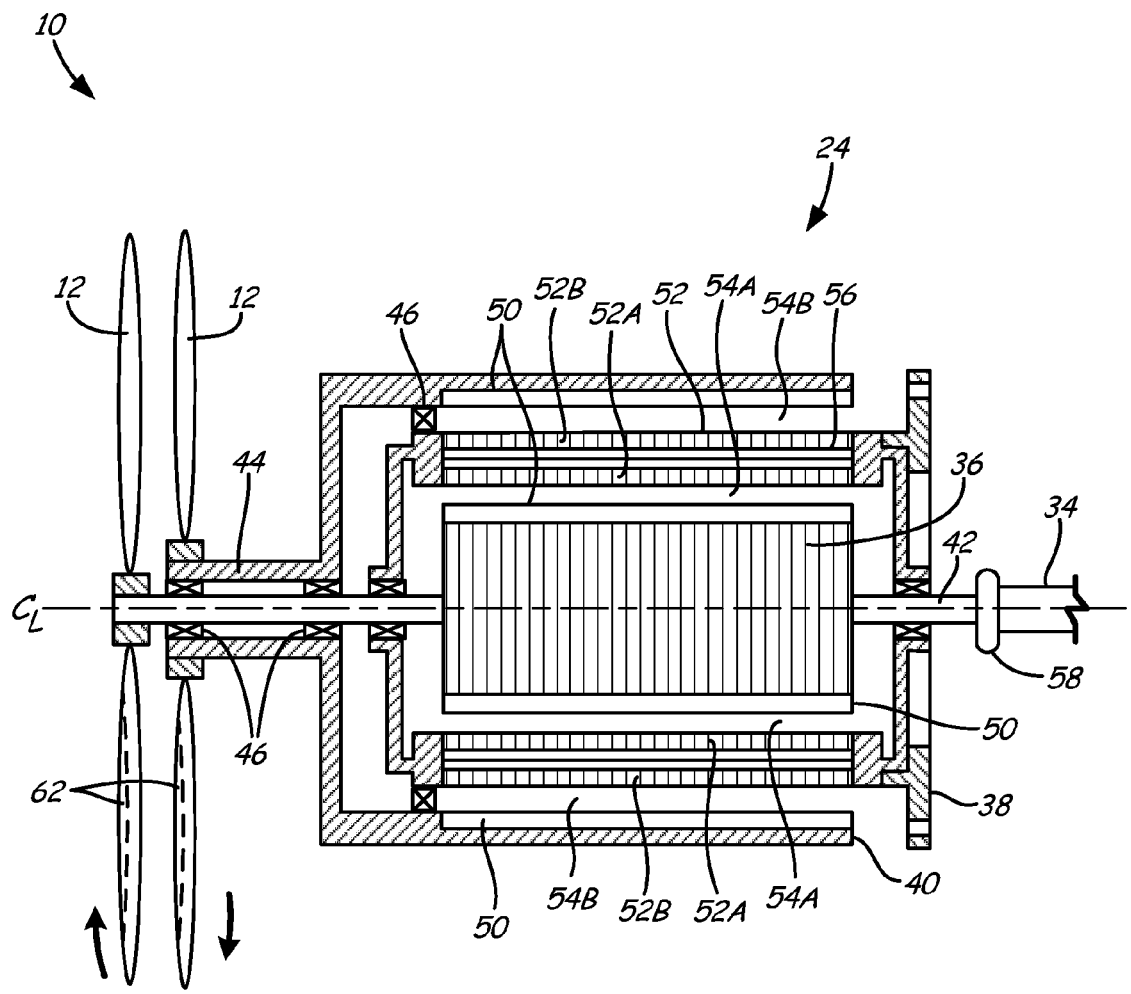
FIG. 2 is a schematic view of the magnetically coupled contra-rotating propulsion stages.

FIG. 2 is a schematic view of magnetic drive 24 for gas turbine (propulsion engine) 10, with coaxial, contra-rotating propulsion stages 12 and 14. In this configuration, magnetic drive 24 is directly coupled to turbine engine shaft 34, without a reduction gearbox. Turbine shaft 34 is rotationally coupled to the power core of propulsion engine 10, for example using a coaxial or offset reduction gearing, or via direct mechanical coupling to a low spool or other turbine shaft.

Magnetic drive 24 drives first (primary) propulsion stage 12 in rotation about centerline $C_L$ via a mechanical coupling between turbine shaft 34 and primary magnetic rotor 36. Magnetic drive 24 drives second (secondary) propulsion stage 14 in contra-rotation about centerline $C_L$ via a magnetic coupling formed by magnetic stator 38 between primary magnetic rotor 36 and secondary magnetic rotor 40.

Primary propulsion rotor stage 12 is mechanically and rotationally coupled to primary (inner) magnetic rotor 36 via primary drive shaft 42. Primary drive shaft 42 is mechanically and rotationally coupled to turbine shaft 34 at the aft (downstream) end, opposite primary propulsion stage 12 on the forward (upstream) end.

Secondary propulsion rotor stage 14 is mechanically and rotationally coupled to secondary (outer) magnetic rotor 40 via secondary drive shaft 44. Secondary drive shaft 44 is magnetically coupled to primary drive shaft 42 and turbine shaft 34 via magnetic stator 38, which forms the magnetic coupling between primary rotor 36 and secondary rotor 40.

Primary (inner) drive shaft 42 and secondary (outer) drive shaft 44 are rotationally supported in a coaxial arrangement on bearings 46. Magnetic stator 38 is coaxially arranged about primary magnetic rotor 36 and secondary magnetic rotor 40 is coaxially arranged about magnetic stator 38, such that magnetic stator 38 located between primary rotor 36 and secondary rotor 40. Alternatively, primary and secondary drive shafts 42 and 44 may be reversed, with the primary (drive) spool components arranged outside the secondary (driven) spool components.

The various rotational and thrust bearings 46 provide radial and axial support to the components of magnetic drive 24, while mechanically and rotationally decoupling propulsion stage 12 on primary drive shaft 42 from contra-rotating propulsion stage 14 on secondary drive shaft 44. As a result, the rotational coupling between contra-rotating propulsion stages 12 and 14 is magnetic, rather than mechanical, as provided by magnetic stator 38 between primary rotor 36 and secondary rotor 40.

Magnetic coupling drive system 24 thus replaces traditional planetary gear trains and other heavy mechanical components with a magnetic coupling between contra-rotating stages 12 and 14, reducing weight and gearing losses as compared to traditional designs. Contra-rotating propulsion stages 12 and 14 may also be configured as fixed-pitch rotor stages, eliminating additional mechanical elements.

This contrasts with traditional turboprop engine designs, where complex oil and cooling systems are required to service the heavy (contra-rotating) reduction gear transmission and controllable pitch mechanisms, as well as the power core. This results in more frequent maintenance, with lower mean time between scheduled repair/removal (MTBSR) and mean time between failures (MTBF). Magnetic drive system 24 allows propulsion engine 10 to eliminate this additional mechanical complexity in the oil and cooling systems, reducing engine weight and improving MTBSR and MTBF for better overall reliability and operational dispatch readiness.

In one design of magnetic drive 24, the magnetic coupling is provided by strong permanent magnet (PM) field components 50 on primary rotor 36 and (contra-rotating) secondary rotor 40, with copper windings or other magnetic coils 52 distributed in slots along magnetic stator (or armature) 38. Suitable materials for PM field components 50 include rare earth magnets, such as neodymium magnets. Occasionally, samarium-cobalt magnet field components 50 are used for high-temperature applications.

In PM configurations, field components 50 provide constant (contra-rotating), substantially radial magnetic fields on primary and secondary rotors 36 and 40. The contra-rotating fields cross air gaps 54A and 54B to interact with the field generated by stator coil 52, transferring torque from primary rotor 36 to secondary rotor 40 to drive secondary propulsion stage 14 in contra-rotation with respect to primary propulsion stage 12. Alternatively, an axial field configuration is utilized.

As shown in FIG. 2, each stator coil 52 has two active elements, inner surface (or inner coil) 52A facing rotating magnetic element 50 on primary (inner) rotor 36 across inner air gap 54A, and outer surface (or outer coil) 52B facing contra-rotating magnetic element 50 on secondary (outer) rotor 40 across outer air gap 54B. Electric current is provided to coils 52, 52A and 52B from the aircraft's on-board (e.g., 28 VDC) power supply, or other current source, generating a magnetic field to couple primary and secondary rotors 36 and 40.

Rotating magnetic elements 50 on primary and secondary rotors 36 and 40 thus create strong coupling forces between coaxial propulsion stages 12 and 14. The field is switched to provide the proper phase relationship for torque transfer between primary and secondary rotors 36 and 40, based on the total field contribution of the coil current (or driving voltage) in combination with the induced EMF (electromagnetic force) generated by rotation of magnetic elements 50 about stator windings 52A and 52B.

The electric currents in magnetic stator 38 and windings 52, 52A and 52B are controlled by brushless contacts, so that counter-rotating magnetic fields are produced in annular air gaps 54A and 54B between stator 38 and primary and secondary magnetic rotors 36 and 40, driving secondary drive shaft 44 into contra-rotation about primary drive shaft 42.

In synchronous operation of magnetic drive 24, an AC supply current is provided or the DC supply current is switched to provide an alternating (AC) or rotating magnetic field in stator coils 52A and 52B, and the field is synchronized to the rotational speeds of contra-rotating rotors 36 and 40. The field switching frequency and phase depend on the number of poles in magnetic elements 50, the number of separate coil (flux generating) elements in stator coils 52A and 52B, and the desired phase relationship to produce contra-rotation of secondary rotor 40 with respect to primary rotor 36.

In asynchronous operation of magnetic drive 24, torque is transferred from primary rotor 36 to secondary rotor 40 via electromagnetic induction. In this configuration, magnetic drive 24 may operate as an induction motor or induction drive, with magnetic stator 38 and magnetic rotors 36 and 40 operating as phased rotating transformers.

In asynchronous or induction motor configurations of magnetic drive 24, magnetic elements 50 may be provided as solid conductive cylindrical or "squirrel cage" windings on one or both of primary magnetic rotor 36 and secondary magnetic rotor 40, rather than PM elements. Alternatively, a wound-rotor design or Gramme winding is used for magnetic elements 50.

Figure 3A:
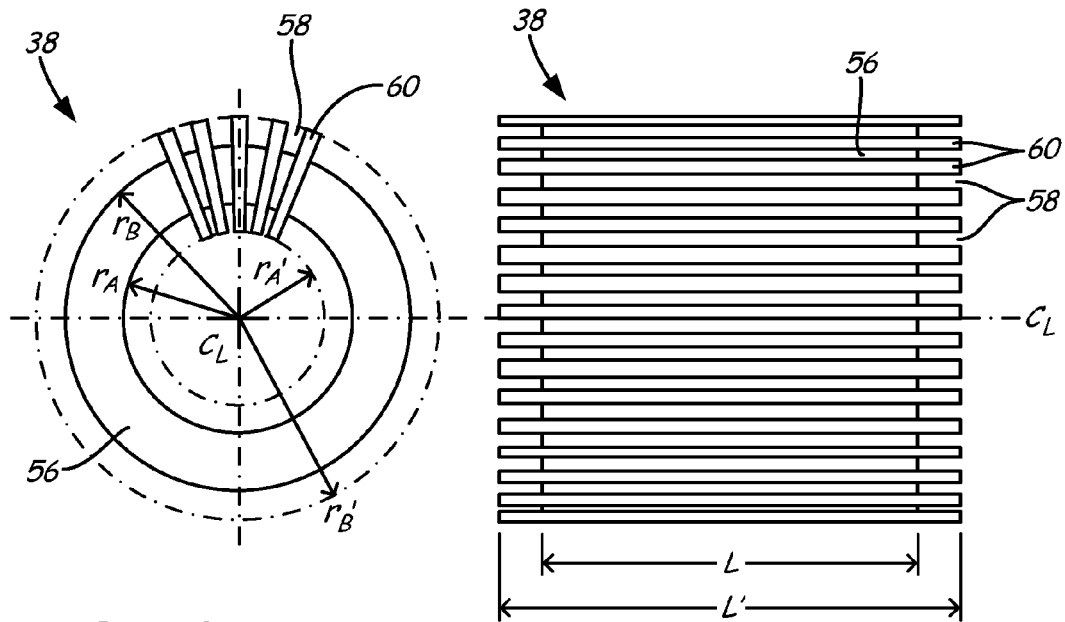
FIG. 3A is a schematic view of a stator slotted core for a Gramme winding.

FIG. 3A is a schematic view of magnetic stator 38 with slotted core 56 for a Gramme winding distributed in radial slots 58. The construction of stator core (yoke) 56 is shown in an end view (left) and in a top view (right), with magnetic stator 38 coaxially oriented about centerline $C_L$ of magnetic drive 24, as shown in FIG. 2.

Stator core 56 is formed of a magnetic material such as laminated magnetic steel or a soft magnetic composite (SMC) material. Stator core (yoke) 56 has inner radius $r_A$ and outer radius $r_B$, measured from centerline $C_L$, and axial length L, measured along centerline $C_L$.

Slots 58 for a Gramme-type single winding (see FIG. 4A) are formed between teeth 60 on stator core 56. Slots 58 and teeth 60 extend the effective radial dimensions of magnetic stator 38 to $r_A{'}$ (inner radius) and $r_B{'}$ (outer radius). Slots 58 and teeth 60 also extend axially at either end (i.e., from the front and back) of stator core 56, increasing the effective axial length of magnetic stator 38 from L to L'.

Figure 3B:
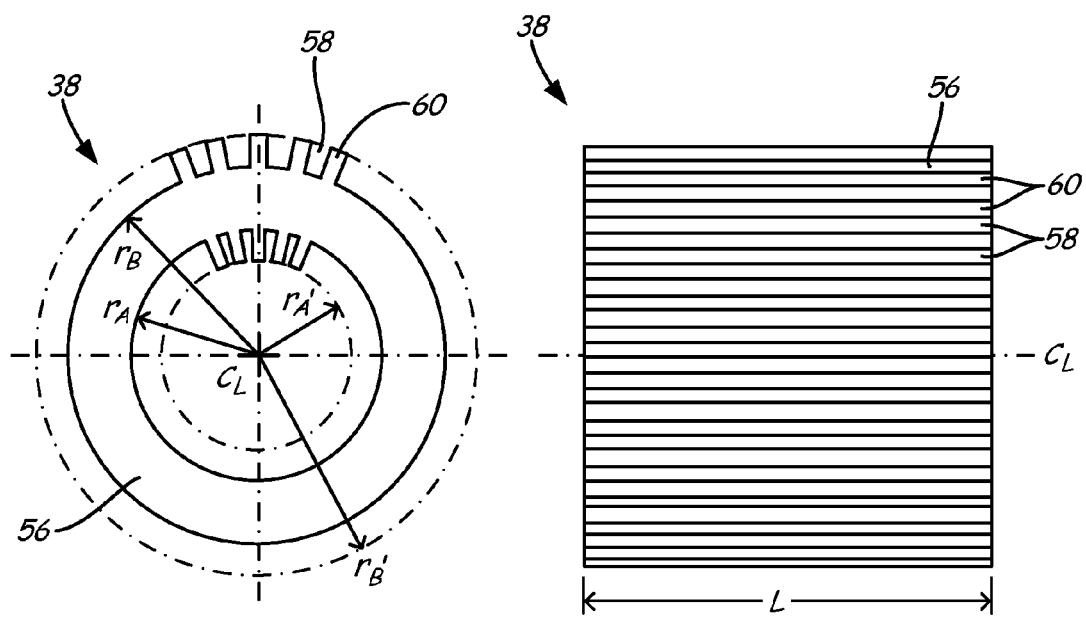
FIG. 3B is a schematic view of a stator slotted core for a Gramme winding or double-layer winding distributed in slots.

FIG. 3B is a schematic view of magnetic stator 38 with slotted core 56 for a Gramme winding or double-layer winding distributed in slots 58. Slots 58 are defined between teeth 60, as described above.

In this configuration, slots 58 and teeth 60 do not extend axially from the front and back of stator core 56, along centerline $C_L$. This design allows for magnetic stator 38 to accommodate either a single Gramme winding (FIG. 4A) or a double-layer winding (FIG. 4B).

Figure 4A:
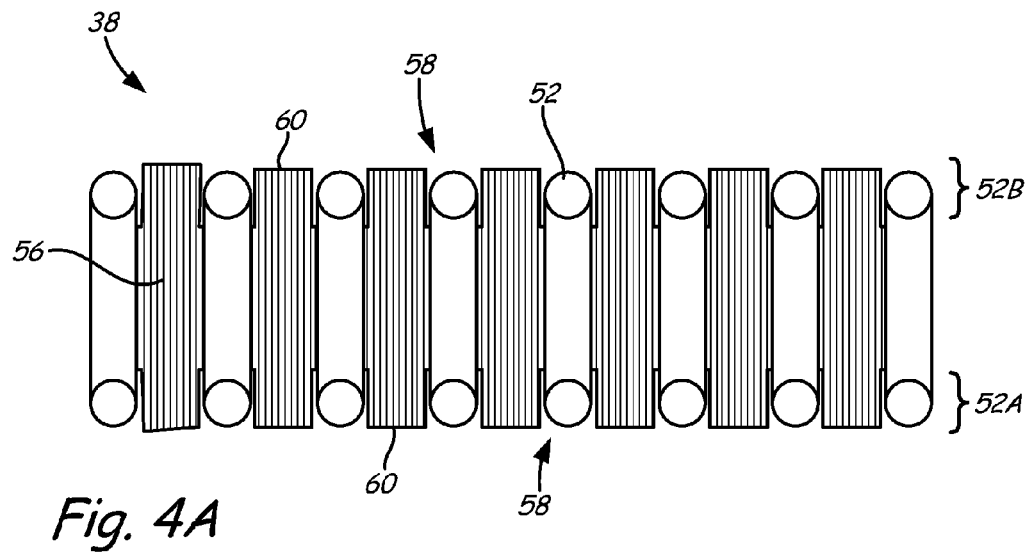
FIG. 4A is a cross-sectional view of a stator polyphase winding spread flat for a Gramme winding.

FIG. 4A is a cross-sectional (end) schematic view of magnetic stator 38 with polyphase winding 52 spread flat, in a Gramme winding configuration. In this configuration, a single or common (Gramme) coil or winding 52 is distributed in slots 58, extending axially between teeth 60.

Coil 52 and stator core 56 are spread flat in the end view of FIG. 4A (with arbitrarily high radius of curvature), in order to illustrate the structure of magnetic stator 38. For this top section of stator core 56, radially inward surface 52A of coil winding 52 is defined along the bottom of stator core 56, and radially outward surface 52B of coil winding 52 is defined along the top of stator core 56. For a bottom section, radially inward and outward surfaces 52A and 52B are reversed (see, e.g., FIG. 2).

Figure 4B:
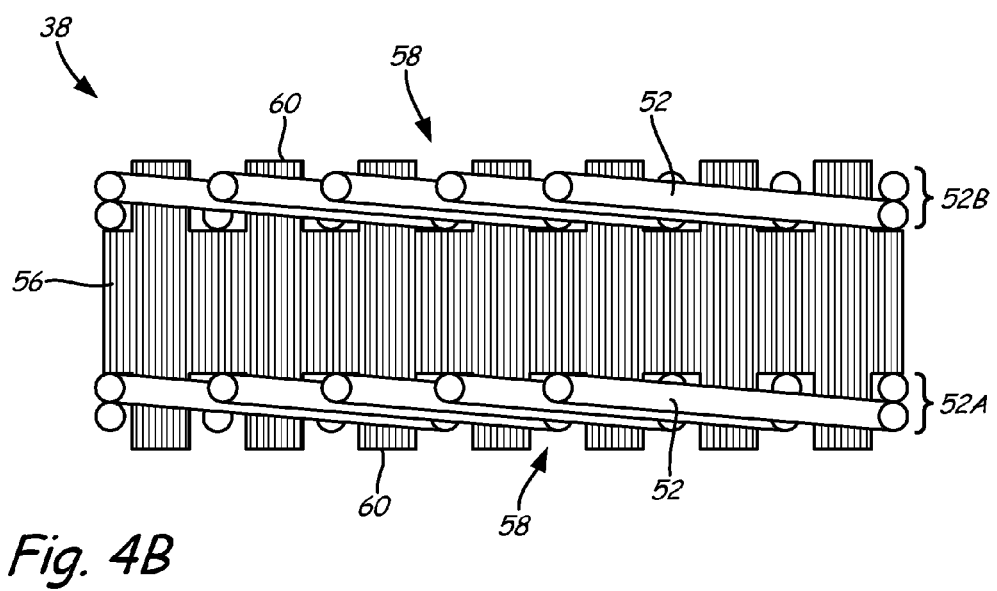
FIG. 4B is a cross-sectional view of a stator polyphase winding spread flat for a double-layer winding comprising distributed-parameter coils.

FIG. 4B is a cross-sectional (end) schematic view of magnetic stator 38, with polyphase winding 52 spread flat, in a double-layer winding configuration comprising distributed-parameter coils 52A and 52B. In this configuration, radially inward and outward coils (or coil surfaces) 52A and 52B are formed as independent polyphase windings.

The winding shown in FIG. 4A is referred to a Gramme winding or Gramme-type coil. In this configuration, the rotational speeds of the two contra-rotating propellers (or propulsion stages) are typically the same. Brushes, commutators and other switching mechanisms are used to determine the direction of field rotation, or to switch between co-rotating and contra-rotating modes.

The double-layer winding shown in FIG. 4B is more typical for the stator of an AC (alternating-current) electrical machine with distributed parameters. In this configuration, the rational speeds and directions of each propeller or propulsion stage can be independently controlled.

Concentrated-parameter, nonoverlapping coils 52, 52A and 52B can also be used for magnetic stator 38. Asynchronous operation can also be utilized to transfer torque between the primary and secondary rotors, provided that rotors are equipped with squirrel-cage windings or solid conductive cylinders.

The slip rate is determined by the difference in stator field frequency, as compared to the rotating magnetic fields. Depending on the slip rate and phase, asynchronous operation also allows for switching between co-rotating and contra-rotating modes.

With respect to FIG. 2, the use of PM magnetic elements 50 on rotors 36 and 40 eliminates the need for brushed rotor couplings, so that magnetic drive 24 has a brushless configuration. In general, however, magnetic elements 50 have permanent magnet, cage-type and wound-rotor configurations, and magnetic drive 24 utilizes a variety of brushless, commutator, slip-ring and external (electronic) switching elements, in both synchronous and asynchronous modes. This allows magnetic drive 24 to selectively drive secondary rotor 40 in contra-rotation or co-rotation about primary rotor 36, or to switch between contra-rotating and co-rotating modes.

In additional configurations of magnetic drive 24, a second copper winding or coil 52 is provided on magnetic stator 38. The secondary coil is switched to reverse the rotating field direction, in order to drive secondary drive shaft 44 in either contra-rotation or co-rotation about primary drive shaft 42. Primary and secondary rotor stages 12 and 14 thus turn in either the same or opposite directions, according to the mode selected for magnetic drive 24.

Typically, the rotor blades in secondary stage 14 are oppositely pitched with respect to the rotor blades in primary stage 12, in order to produce thrust in contra-rotation. When stages 12 and 14 co-rotate, therefore, secondary stage 14 produces reverse thrust for braking and ground maneuvers. In some designs, co-rotating or contra-rotating propulsion stages 12 and 14 are also provided with variable pitch mechanisms for additional thrust control and braking capability.

The number of poles on coil 52 can also selected to drive propulsion stages 12 and 14 at different speed ratios of, for example, 1:1, 2:1 or 3:2, and in either contra-rotation or co-rotation about centerline $C_L$. Alternatively, windings 52A and 52B may be de-energized, in order to decouple or disable secondary propulsion stage 14, for example during cruise operations. Clutch mechanism 58 may also be provided to decouple primary propulsion stage 12 from turbine shaft 34, for operation of propulsion engine 10 to provide cabin power and environmental control (pre-heat and pre-cool capabilities) during ground operations.

Contra- and co-rotation switching and rotor speed control are fully integrated with the aircraft EEC (electronic engine control) and FADEC (full authority digital engine control) system architecture. This provides seamless automated thrust reversal and rotor speed settings in short landing operations, with enhanced breaking capability in adverse weather conditions and on slippery runways. Electrical resistive heating systems 62 may also be used, in order to prevent unwanted ice and snow accumulation on the blade leading edges and other surfaces of propulsion rotor stages 12 and 14.

Magnetic drive system 24 also reduces noise and vibration levels during operation of propulsion engine 10, as compared to a planetary or spur gear transmission. In particular, the rotational coupling mechanism between primary rotor 36 and secondary rotor 40 is magnetic, without torque transfer through highly loaded moving parts. Propulsion engine 10 also consumes less lubricating oil, with smaller reservoir requirements for further weight and cost reductions.

To achieve these advantages, propulsion engine 10 may be configured either as a contra-rotating turboprop or contra-rotating turbofan engine, as described above with respect to FIG. 1. Alternatively, propulsion engine 10 may be configured as a contra-rotating turboshaft engine for a rotary-wing aircraft, for example a heavy-lift helicopter with contra-rotating main rotors, or for use on a small unmanned aircraft. Propulsion engine 10 can also be configured as an integrated turbo-ramjet, for use as a high speed missile propulsion system.

While this invention has been described with reference to exemplary embodiments, it will be understood by those skilled in the art that various changes may be made and equivalents may be substituted for elements thereof without departing from the spirit and scope of the invention. In addition, modifications may be made to adapt a particular situation or material to the teachings of the invention, without departing from the essential scope thereof. Therefore, the invention is not limited to the particular embodiments disclosed herein, but includes all embodiments falling within the scope of the appended claims.

The invention claimed is:

1. A turbomachine comprising:
a turbine shaft rotationally mounted along an axis;
a first rotor rotationally coupled to the turbine shaft and coaxially arranged about the axis;
a first propulsion stage rotationally coupled to the first rotor, opposite the turbine shaft;
a second rotor coaxially arranged about the first rotor;
a second propulsion stage rotationally coupled to second rotor, opposite the turbine shaft and adjacent the first propulsion stage;
a magnetic stator coaxially arranged between the first rotor and the second rotor and forming a magnetic coupling between the first rotor and the second rotor to drive the second propulsion stage in contra-rotation with respect to the first propulsion stage.

2. The turbomachine of claim 1, wherein the first and second rotors comprise permanent magnetic elements to form the magnetic coupling.

3. The turbomachine of claim 1, wherein the first and second rotors comprise cage windings to form the magnetic coupling.

4. The turbomachine of claim 1, wherein the stator coil comprises first and second windings to form the magnetic coupling.

5. The turbomachine of claim 4, wherein the first and second windings are switchable to drive the first and second propulsion stages in co-rotation about the axis.

6. The turbomachine of claim 1, wherein the magnetic stator comprises a coil having a number of poles selected to drive the first and second propulsion stages at different rotational speeds.

7. The turbomachine of claim 1, further comprising an engine core coupled to the turbine shaft opposite the first rotor, the engine core comprising a compressor, a combustor and a turbine arranged in flow series along the axis.

8. A turboprop engine comprising the turbomachine of claim 7, wherein the first and second propulsion stages comprise contra-rotating propellers.

9. The turboprop engine of claim 8, further comprising a clutch mechanism coupled to the first rotor, wherein the clutch mechanism is operable to rotationally decouple the contra-rotating propellers from the turbine shaft.

10. A turbofan engine comprising the turbomachine of claim 7, wherein the first and second propulsion stages comprise contra-rotating fan rotors.

11. A turboshaft engine comprising the turbomachine of claim 7, wherein the first and second propulsion stages comprise contra-rotating lift rotors.

12. A propulsion engine comprising:

an engine core comprising a compressor, a combustor and a turbine arranged in flow series along an axis;

a primary magnetic rotor rotationally coupled to the engine core along the axis;

a primary propulsion rotor coaxially coupled to the primary magnetic rotor, opposite the engine core along the axis;

a secondary magnetic rotor coaxially arranged about the primary magnetic rotor;

a secondary propulsion rotor coaxially coupled to the secondary magnetic rotor, opposite the engine core along the axis and adjacent the primary propulsion rotor; and a magnetic stator coaxially arranged between the primary magnetic rotor and the secondary magnetic rotor, the magnetic stator forming a magnetic coupling between the primary and secondary magnetic rotors to drive the primary and secondary propulsion stages in contra-rotation about the axis.

13. The propulsion engine of claim 12, wherein the primary and secondary magnetic rotors comprise permanent magnet elements to form the magnetic coupling.

14. The propulsion engine of claim 12, wherein the primary and secondary magnetic rotors comprise cage windings or solid conductive cylinders to form the magnetic coupling.

15. The propulsion engine of claim 12, wherein the magnetic stator comprises a two windings distributed in inner and outer slots switchable to drive the primary and secondary propulsion rotors in co-rotation about the axis.

16. The propulsion engine of claim 12, wherein the magnetic stator comprises a coil having a selected number of poles to drive the primary and secondary propulsion rotors at different rotational speeds.

17. A turboprop engine comprising the propulsion engine of claim 12, wherein the primary and secondary propulsion rotors comprise contra-rotating propellers.

18. The turboprop engine of claim 17, further comprising a clutch mechanism to decouple the contra-rotating propellers from the engine core.

19. The turboprop engine of claim 17, wherein the contra-rotating propellers have different numbers of blades.

20. A turbofan engine comprising the propulsion engine of claim 12, wherein the primary and secondary propulsion rotors comprise contra-rotating fan stages.

* * * * *